United States Patent [19]

van Hardeveld et al.

[11] Patent Number: 4,625,061

[45] Date of Patent: Nov. 25, 1986

[54] PROCESS FOR PREPARING CYANAMIDE

[75] Inventors: Rudolf van Hardeveld; Theodorus J. van de Mond, both of Geleen; Franciscus H. A. M. J. Vandenbooren, Maastricht, all of Netherlands

[73] Assignee: Stamicarbon B.V., Geleen, Netherlands

[21] Appl. No.: 708,844

[22] Filed: Mar. 6, 1985

[30] Foreign Application Priority Data

Mar. 6, 1984 [NL] Netherlands ..................... 8400717

[51] Int. Cl.$^4$ ................. C07C 125/08; C07D 251/60; C07D 251/58; B01J 29/18
[52] U.S. Cl. .................................... 564/103; 564/106; 544/201; 544/202; 502/78
[58] Field of Search ................ 564/103, 106; 544/201, 544/202; 502/78

[56] References Cited

U.S. PATENT DOCUMENTS

| | | | |
|---|---|---|---|
| 2,721,786 | 10/1955 | Boatright et al. | 544/202 |
| 2,760,961 | 8/1956 | Mackay | 260/249.7 |
| 2,783,131 | 2/1957 | Mackay | 23/190 |
| 3,093,644 | 6/1963 | Steggerda | 544/201 |
| 3,414,571 | 12/1968 | Haines et al. | 544/201 |

FOREIGN PATENT DOCUMENTS

| | | | |
|---|---|---|---|
| 1028126 | 9/1954 | Fed. Rep. of Germany. | |
| 718934 | 11/1954 | United Kingdom | 544/201 |

*Primary Examiner*—Charles F. Warren
*Assistant Examiner*—R. A. Picard
*Attorney, Agent, or Firm*—Cushman, Darby & Cushman

[57] ABSTRACT

An improved process for the preparation of cyanamide or a cyanamide-containing gas mixture by passing urea and/or urea decomposition products over a catalyst at a temperature in the range of between about 200° C. and 600° C. A porous catalyst is utilized which has an intracrystalline pore diameter of at most 8 Å, whereby a high conversion to cyanamide is obtained and the formation of melamine by-products is substantially reduced.

3 Claims, No Drawings

PROCESS FOR PREPARING CYANAMIDE

BACKGROUND OF THE INVENTION

The present invention relates to a process for preparing cyanamide by passing urea and/or urea decomposition products at a temperature of between 200° C. and 600° C. over a porous catalyst.

From U.S. Pat. No. 2,721,786 it is known how to prepare cyanamide from ammonia and carbon dioxide at temperatures of between 350° C. and 800° C. in the presence of a porous inorganic oxide gel having a large surface area. Furthermore, U.S. Pat. No. 2,760,961 describes the preparation of mixtures of cyanamide and its trimer melamine from urea or biuret at a temperature of at least 220° C. in the presence of a highly porous gel or other oxide gel of an amphoteric element as a catalyst. It is there disclosed that suitable catalysts must have a large internal surface area and/or volume, and that the pores of this catalyst may have dimensions ranging from 60 to 70 A, but these pores may also be larger or smaller. A similar process is also described in published German patent application No. 1,028,126.

In all of these known processes, a considerable amount of melamine is formed in addition to cyanamide, which is not surprising inasmuch as the chemical reaction equilibrium of the trimerization of cyanamide to melamine favors the formation of melamine. If cyanamide is the desired product, however, this secondary production of melamine is a great nuisance. For this reason processes have been sought in which the formation of melamine is inhibited, and conversely the formation of cyanamide is promoted.

In U.S. Pat. No. 2,783,131 it is stated that a reaction temperature of at least 450° C.–650° C. or even higher must be applied if cyanamide is the desired product. Even under these conditions, however, an optimum yield of cyanamide is still not obtained.

The object of the present invention, therefore, is to provide a process for preparing cyanamide with a high conversion in which only a minor amount of melamine is formed, without having to utilize extreme reaction conditions.

Surprisingly, it has now been found that the use of a catalyst having an uniform intracrystalline pore diameter of at most 8 Å has a favorable effect on the formation of cyanamide, and suppresses the undesirable formation of melamine. An uniform intracrystalline pore diameter of at least 3 Å has been found to have a positive effect on the conversion into cyanamide.

The term 'intracrystalline pore diameter' as used herein should be understood to mean the dimension of the pores as described in D. W. Breck in Zeolite, Molecular Sieves, Chapter b 8 C (publ. J. Wiley & Sons, New York, 1974). In particular, it indicates the size of the free apertures of the catalyst to be determined by the size of the largest molecules that can enter the inner surface of the catalyst under a given set of conditions.

The present invention is, therefore, directed to the preparation of cyanamide from urea and/or decomposition products thereof in the presence of a catalyst whose intracrystalline pore diameter is at most 8 Å. In particular, the formation of cyanamide takes place with added advantage when the intracrystalline pore diameter is within the range of between at least 4 Å and at most 6 Å, preferably at most 5 Å. Within these limits the highest conversion of urea and/or its deocmposition products to cyanamide is obtained with a very low formation of by-products.

Various kinds of materials can be used as the catalyst in accordance with this invention, provided the intracrystalline pore diameter is maintained within the above range. The materials used may already have an intracrystalline pore diameter of the desired size, or the pores can be reduced or enlarged as required.

The reduction of the intracrystalline pore diameter can be effected by absorbing metal ions into the crystal structure. This is preferably accomplished by using metal ions that do not deactivate catalytically active positions. Suitable metals for this purpose can be found in Groups II A, II B, III B, and VIII of the Periodic System of elements. In particular, ions of magnesium, calcium, iron, nickel, and the various lanthanides have been found to be suitable.

It is also possible to exchange the cations present on the catalyst for larger cations of the same valency in order to reduce the intracrystalline pore diameter. On the other hand, effecting an exchange between the cations present on the catalyst with smaller cations will make the pores larger.

In particular, preference is given in the process in accordance with the present invention to the use of natural or synthetic zeolites, or to crystalline materials with a zeolite structure.

Zeolites are crystalline aluminosilicates whose crystalline structure surrounds a pore system that may be filled wholly or partially with water or cations. An example thereof is an aluminum-silicon-oxygen compound whose crystalline structure consists of a tetrahedral structure of oxygen molecules. Silicon or aluminum may be present in the lattice vacancies.

It is also possible to use a material in which the aluminum has been replaced in whole or in part by boron. The material will then have a zeolite structure.

The catalytically active positions, specifically acid positions, are present in the pores formed by the crystal lattice. It is advantageous to use a catalyst having catalytically active positions in the pores only. If the outer surface also contains catalytically active positions, undesirable secondary reactions will occur. Preference is, therefore, given to the use of a catalyst having an inert outer surface. A process for preparing such a catalyst having an inert outer surface, without adversely affecting the active positions in the pores, is described in European patent application No. 86543 laid open to public inspection.

The catalyst as described above can be used as such in the process of this invention, but in certain embodiments it may be advantageous for the catalyst to be applied to, or to be mixed with, an inert binder or a binder which has been rendered inert. This may be done, for instance, in order to obtain a pellet-shaped catalyst. Examples of suitable binders are silica, silica-alumina, various clays and carbon.

One of the advantages of the process according to the present invention, compared with the process according to U.S. Pat. No. 2,783,131, is that it is possible for cyanamide to be prepared at substantially lower temperatures while retaining a high degree and rate of conversion. This, of course, can result in a considerable cost-saving with respect to energy consumption. Moreover, owing to the possibility of working at a lower temperature, it is possible to use lower cost, less corrosion-resistant material of construction. This is an advantage from an investment point of view. On the other hand, the process of this invention may also be carried out at high temperatures with the advantage that a very high rate of reaction is obtained, so that relatively short residence times, and consequently relatively smaller equipment, will suffice.

Another advantage of the process according to the present invention is the high selectivity of the reaction, so that few undesirable by-products are formed, enabling relatively unsophisticated separation techniques to be used to separate out the by-products from the product cyanamide.

The cyanamide can be prepared in accordance with the present invention by introducing urea and/or decomposition products thereof, such as cyanic acid or isocyanic acid, at temperatures between 200° and 600° C. into a reactor in which the catalyst is present. The catalyst can be present in the reactor, for instance, in the form of a fixed or fluid bed of catalyst particles. The form in which the catalyst is most advantageously present is primarily determined by the various aspects of the process technology being used, such as heat and material transfer, residence time, strength of the catalyst particles, and the like.

When applying temperatures higher than about 300° C., preference is given to a fluid bed of catalyst particles, into which fluid bed the required heat is introduced via heating coils which are heated electrically or by means of molten salt.

Preferably, urea and/or its decomposition products are introduced into the reactor by means of a carrier gas. In particular, the urea may be utilized in a molten state, and sprayed into a fluid bed cracker or into a tubular reactor by means of a carrier gas while being simultaneously heated so that cyanic acid or isocyanic acid is formed. This mixture thus formed is thereafter passed into the catalyst containing reactor.

As a suitable carrier gas, any type of gas that does not interfer with the formation of cyanamide may be used. Examples of such suitable gases or gas mixtures are ammonia, nitrogen, carbon dioxide, the various inert gases, or mixtures of such gases. Preference is given to ammonia because ammonia is also released in the reaction from urea into cyanic acid or isocyanic acid. By using ammonia as the carrier gas as well, an extra separation step can be omitted. Preferably, the ratio of carrier gas (in normal liters, i.e., at 0° C. and 1 bar) to the amount of urea (in grams) will be in the range of between 0.5:1 and 10:1 normal liter/g.

The residence time, expressed as the bedvolume in the fluidised state divided by the superficial velocity, of the reaction mixture in the reactor will preferably be in the range of from less than 0.1 second up to a few minutes, for instance from 0.01 second to 10 minutes, more preferably from 0.1–30 seconds. The most advantageous residence time is determined particularly by the number of active positions in the catalyst, the partial pressure of the starting materials (cyanic acid and isocyanic acid) in the reactor and the temperature. Generally, this partial pressure will be chosen between about 0.1 and 3 bar.

The total pressure in the reactor is not critical. The upper limit of this total pressure should be lower than the pressure at which uncatalyzed formation of melamine will occur. Generally, this total pressure in the reactor should be in the range of between about 0.1 and 50 bar.

The reaction mixture obtained from the reactor contains cyanamide, carbon dioxide, and ammonia. In addition, the mixture may contain minor amounts of by-product and non-converted cyanic acid. If a carrier gas other than ammonia is used, that carrier gas will also be present in the reaction mixture.

Product cyanamide can be recovered from this reaction mixture by known techniques, for instance by extraction with ether. The remaining carrier gas can be recirculated in whole or in part, optionally after complete or partial purification. It is also possible to recover the cyanamide by causing it to dimerize to form dicyandiamide and subsequently to recover this dicyandiamide by crystallization.

The invention will now be elucidated by means of a few examples.

In the examples the starting material that was used was isocyanic acid (HNCO). This was prepared by supplying urea and ammonia to a fluid bed cracker in a proportion indicated in column 2 of the table. The HNCO thus formed was supplied to a fluid bed reactor under a partial pressure as indicated in column 3 of the table. The moment of sampling after commencement of the experiment is given in column 4 and the temperature at which the reaction took place in column 5. Column 10 shows the conversion percentage. Type, amount and pore diameter of the catalysts are given in columns 7, 8 and 9 respectively. Columns 11 and 12 give the percentages of, respectively, melamine and cyanamide found in a sample, as determined by means of liquid chromatography.

| 1 Example | 2 Feed Ratio $NH_3$ (Normal Lit.)/g Urea | 3 Partial $P_{HNCO}$ (Bar) | 4 Sample Time (Hours) | 5 Temp (°C.) | 6 Residence Time (Sec) | 7 Catalyst Type | 8 Catalyst Amount (g) | 9 Intra-Crystal. Pore Dia. | 10 Conversion (%) | 11 Melamine (%) | 12 Cyanamide (%) |
|---|---|---|---|---|---|---|---|---|---|---|---|
| A | 2.39 | 0.119 | 1 | 400 | 0.22 | act carbon | 10 |  | 2.6 | 26.9 | 73.1 |
| 1 | 4.0 | 0.062 | 1 | 390 | 0.18 | mordenite H+ | 10 | ≦5 Å | 9.0 | 1.1 | 98.9 |
| 2 | 4.4 | 0.060 | 1 | 390 | 1.13 | mordenite H+ | 50 | ≦5 Å | 27.4 | 28.5 | 71.5 |
| B | 2.13 | 0.133 | 1 | 380 | 0.21 | $SiO_2$ | 10 | 35 Å** | 19.9 | 70.3 | 29.7 |
| C | 2.13 | 0.133 | 3 | 420 | 0.23 | $SiO_2$ | 10 | 35 Å** | 22.7 | 66.1 | 33.9 |
| D | 2.06 | 0.133 | 1 | 380 | 0.15 | mordenite H+ | 10 | 8 Å | 7.6 | 11.9 | 88.1 |
| E | 2.06 | 0.133 | 3 | 400 | 0.15 | mordenite H+ | 10 | 8 Å | 8.9 | 15.7 | 84.3 |
| 3 | 4.4 | 0.060 | 1 | 390 | 0.91 | mordenite H+ | 40 | ≦5 Å* | 36.3 | 10.7 | 89.3 |
| 4 | 4.4 | 0.060 | 3 | 390 | 0.91 | mordenite H+ | 40 | ≦5 Å* | 34.1 | 9.7 | 90.3 |
| 5 | 2.9 | 0.083 | 2 | 415 | 1.89 | mordenite H+ | 40 | ≦5 Å* | 33.3 | 23.7 | 76.3 |
| 6 | 2.9 | 0.083 | 3 | 390 | 1.82 | mordenite H+ | 40 | ≦5 Å* | 28.1 | 17.4 | 82.6 |

*Outer surface made inert by cation exchange (H+ → Na+).
**Average pore diameter.

What is claimed is:

1. An improved process for the preparation of cyanamide or a cyanamide-containing gas mixture by passing urea and/or urea decomposition products over a catalyst at a temperature in the range of between about 200°

C. and 600° C., said improvement essentially comprising utilizing as said catalyst a porous catalyst having an intracrystalline pore diameter of at most 8 Å wherein the outer surface of said catalyst has been rendered catalytically inert while leaving the interior surface within said pores catalytically active.

2. The process of claim 1 wherein said outer surface of said catalyst has been rendered inert by cation exchange.

3. An improved process for the preparation of cyanamide or a cyanamide-containing gas mixture by passing urea and/or urea decomposition products over a catalyst at a temperature in the range of between about 200° C. and 600° C., said improvement essentially comprising utilizing as said catalyst a porous catalyst having an intracrystalline pore diameter of at most 8 Å wherein said pore diameter has been obtained by absorbing cations on the catalyst.

* * * * *